United States Patent [19]

Ecker

[11] 4,308,042
[45] Dec. 29, 1981

[54] HEAT PUMP WITH FREEZE-UP PREVENTION

[75] Inventor: Amir L. Ecker, Dallas, Tex.

[73] Assignee: Atlantic Richfield Company, Los Angeles, Calif.

[21] Appl. No.: 140,705

[22] Filed: Apr. 11, 1980

[51] Int. Cl.³ .................... F25B 27/00; F25D 21/10
[52] U.S. Cl. ............................... 62/82; 62/282;
62/150; 62/176 A; 165/29; 126/427; 126/428;
62/235.1
[58] Field of Search ............... 165/29, 17, 20, 21;
62/282, 2, 82, 156, 176 R, 176 C, 176 D, 176 E,
176 A, 80, 150; 126/419, 420, 421, 427, 433,
435; 237/2 B

[56] References Cited

U.S. PATENT DOCUMENTS

| | | |
|---|---|---|
| 2,401,560 | 6/1946 | Graham et al. ............ 165/17 X |
| 2,468,626 | 4/1949 | Graham .................... 165/29 X |
| 3,584,785 | 6/1971 | Matulich ................... 165/17 X |
| 3,859,502 | 1/1975 | Heaney ..................... 62/176 D |
| 3,922,876 | 12/1975 | Wetherington, Jr. et al. .... 62/238.6 X |
| 4,098,092 | 7/1978 | Singh ........................ 62/238.6 |
| 4,172,493 | 10/1979 | Jacobs ....................... 62/82 X |
| 4,187,687 | 2/1980 | Savage ...................... 62/2 |
| 4,256,475 | 3/1981 | Schafer ..................... 62/2 |
| 4,265,092 | 5/1981 | Abraham ................... 62/176 A |

Primary Examiner—William E. Wayner
Assistant Examiner—Harry Tanner
Attorney, Agent, or Firm—Wofford, Fails & Zobal

[57] ABSTRACT

What is disclosed is a heat pump apparatus for conditioning a fluid characterized by a fluid handler and path for circulating the fluid in heat exchange relationship with a refrigerant fluid; at least two refrigerant heat exchangers, one for effecting heat exchange with the fluid and a second for effecting heat exchange between refrigerant and a heat exchange fluid and the ambient air; a compressor for efficiently compressing the refrigerant; at least one throttling valve for throttling liquid refrigerant; a refrigerant circuit; refrigerant; a source of heat exchange fluid; heat exchange fluid circulating device and heat exchange fluid circuit for circulating the heat exchange fluid in heat exchange relationship with the refrigerant; and valves or switches for selecting the heat exchangers and direction of flow of the refrigerant therethrough for selecting a particular mode of operation. The heat exchange fluid prevents freeze up of the second heat exchanger by keeping the temperature above the dew point; and, optionally, provides heat for efficient operation.

10 Claims, 2 Drawing Figures

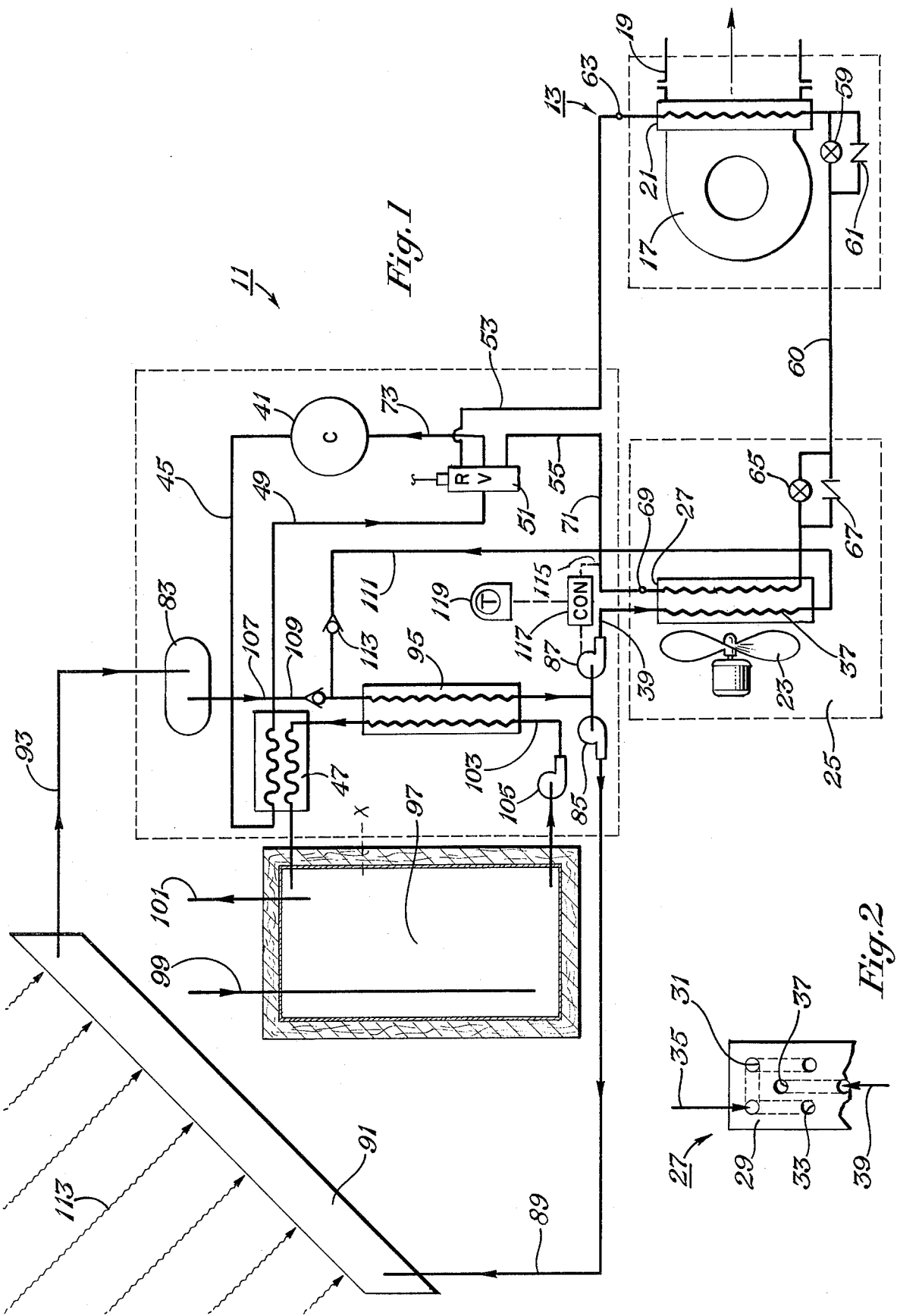

HEAT PUMP WITH FREEZE-UP PREVENTION

FIELD OF THE INVENTION

This invention relates to apparatus for conditioning a fluid; such as air used in cooling or heating an enclosed space in which the air is circulated in heat exchange relationship with a refrigerant fluid. More particularly, this invention relates to heat pump apparatus for conditioning an enclosed space and employing a supplemental heat exchange fluid to prevent freeze-up of an evaporator in ambient air, and/or to provide an alternate source of heat in addition to an ambient heat exchanger.

DESCRIPTION OF THE PRIOR ART

The prior art is replete with a wide variety of types of apparatuses for air conditioning enclosed space, such as buildings and the like. Heat pumps have been used to pump heat from one location to another at a coefficients of performance greater than one, or more economically than heat could be generated if the enclosed space were to be heated by electrical heaters. As is recognized, in heat pump systems heat is absorbed by a refrigerant by vaporizing the condensed liquid; for example, in an outdoor heat exchanger in heat exchange with ambient air. This then allows the refrigerant to be taken into a compressor as a gas. The compressor compresses the gas to high pressure, high temperature gas that is then heat exchanged with the air circulated in the building in the heating mode and the gas is condensed to a relatively warm liquid. The liquid is then again flashed past an expansion means into the outdoor heat exchanger where it is vaporized to a gas to repeat the cycle. One of the severe problems in the prior art has been the freeze-up of the outdoor heat exchanger when operated as an evaporator. Specifically, the temperature of the boiling refrigerant brings the temperature of the heat exchanger coils below the dew point of the ambient air so that moisture condenses on the coils. Further decrease in the temperature below the freezing point then freezes the condensed moisture, forming ice. The ice builds up and eventually completely blocks the flow of air through the heat exchanger. In most conventional heat pumps, to gain heat sufficient to melt the ice from the coils of the outdoor heat exchanger, the unit in the building is operated as a evaporator with resultant penalty of imposing additional cooling load on the building that already needs heat with attendant discomfort to the tenants.

Many systems have been tried to employ some supplemental heat source for defrosting the outdoor heat exchanger. Typical of these prior art systems are those described in the following U.S. Patents. U.S. Pat. No. 2,188,811 discloses an air conditioning plant in which the indoor air was circulated over the evaporator to melt the ice. U.S. Pat. No. 2,584,573 disclosed a method for storing heat in the ground beneath the house in a labyrinth of pipes through which the hot refrigerant liquid was caused to pass. U.S. Pat. No. 2,689,090 disclosed a heating system employing a heat exchanger disposed in the soil outside the space to be air conditioned and means for extracting that heat and taking it into the space. U.S. Pat. No. 2,693,939 disclosed a heating and cooling system with a sensing element to detect the rate of the heat intake into the heat receiver, as for solar radiation, and a second sensing element operative in response to the evaporator exit temperature to control the flow of refrigerant. U.S. Pat. No. 2,829,504 uses ambient air to defrost. U.S. Pat. No. 2,847,190 discloses an air conditioning apparatus having automatic defrost with auxiliary heaters at the evaporator coil. U.S. Pat. No. 2,970,816 also shows the use of auxiliary heaters at the evaporator coil to melt the ice. U.S. Pat. No. 3,189,085 shows air conditioning apparatus that uses air heated and circulated over the evaporator to defrost the evaporator, the heater being an electric resistance heater. U.S. Pat. No. 4,030,312 shows the use of solar heat for melting the ice on the evaporator. U.S. Pat. No. 4,049,407 discloses a heating system for building structure in which heat from solar collectors and from warm air is stored in the earth which surrounds the heat pump system. U.S. Pat. No. 4,062,489 discloses a solar-geothermal heat system. U.S. Pat. No. 4,065,938 discloses air conditioning apparatus with a booster heat exchanger. U.S. Pat. No. 4,112,920 discloses a solar heater including a rotatable tank with means for absorbing heat from the sun. U.S. Pat. No. 4,165,037 shows apparatus and method for combined solar and heat pump heating and cooling with means for combining refrigerant flow from second and third heat exchanger coils before entering the suction side of the compressor. U.S. Pat. No. 4,165,036 discloses an elaborate multi source heat pump air conditioning system including a convertible heat exchange means alternately operable for collection of solar heat in the first heat exchange liquid and for radiation of internal heat from a second heat exchange liquid with the media having high and low thermal masses and valve means for selective closed loop circulation through the convertible heat exchange means.

From the foregoing it can be seen that the prior art systems have required elaborate interconnection between heat sources and storage areas, supplemental heat exchangers, heaters and the like. Specifically, the prior art systems have not provided a simple heat pump system that is operable in heating or cooling mode and that can be operable in the heating mode without freezing-up of the outdoor heat exchanger being operated as an evaporator and without requiring supplemental heat exchangers, heaters and the like. In particular, the prior art has not provided a system in which the evaporator temperature was maintained above the dew point of the ambient air such that it could be operated to prevent new frost from forming by keeping it above the dew point of the ambient air; and, optionally, was operated to provide heat for efficient operation.

Moreover, the prior art systems were not inexpensive enough to allow existing systems to be retro-fitted, or modified into the new system.

SUMMARY OF THE INVENTION

Accordingly, it is an object of this invention to provide a heat pump system that does not require an elaborate heat source, supplemental heaters, supplemental heat exchangers, or heat storage means; but is simple and economical enough that it can provide an improved new systems, or allow existing systems to be modified.

It is a specific object of this invention to provide a simple heat pump system that is operable in a heating mode without freeze-up of the evaporator, such as the outdoor heat exchanger, and without requiring supplemental heaters, supplemental heat exchangers, supplemental heat storage areas.

It is also a specific object of this invention to provide a heat pump system in which the heat exchange fluid maintains the evaporator above the dew point to prevent formation of frost, or ice, and, optionally, provide heat for efficient operation.

In accordance with this invention, there is provided an apparatus for conditioning of fluid comprising:

a. a fluid handler and fluid path means for circulating the fluid in a path in heat exchange relationship with a refrigerant fluid;

b. at least two refrigerant heat exchangers, the first of the heat exchangers being disposed in the path of the fluid so that the fluid is flowed therepast in heat exchange relationship therewith and the second of the heat exchangers being disposed in a heat exchange fluid circuit for circulating the refrigerant in heat exchange relationship with the heat exchange fluid and disposed in the path of ambient air for circulating the refrigerant in heat exchange relationship with the ambient air;

c. at least one compressor connected into the refrigerant circuit for efficiently compressing the refrigerant from its inlet pressure to its discharge pressure under conditions of operation of the refrigerant circuit;

d. at least one throttling valve connected at the inlet of a heat exchanger in which the liquid refrigerant is being vaporized;

e. a refrigerant circuit serially connecting the heat exchangers, throttling valve and compressor and defining a flow path for the refrigerant;

f. means for selecting the heat exchangers and direction of flow of refrigerant therethrough for selecting a particular mode of operation of the heat pump;

g. refrigerant disposed in the refrigerant circuit and adapted to be circulated in a selected flow path for transferring heat at a coefficient of performance greater than one;

h. a source of heat exchange fluid;

i. heat exchange fluid circulating means for circulating the heat exchange fluid in a heat exchange circuit and in heat exchange relationship with the refrigerant;

j. a heat exchange circuit serially connecting the heat exchange fluid source, circulating means and the second heat exchanger;

whereby the heat exchange fluid can be circulated through the second heat exchanger to keep the second heat exchanger from freezing-up when operated as an evaporator and/or provide heat for efficient operation.

In an aspect of this invention and, preferably, the heat exchange fluid is circulated to maintain the temperature of the second heat exchanger above the dew point of the ambient air so as to prevent condensation of the moisture and thereby prevent freezing, or freeze-up, of the evaporator.

BRIEF DESCRIPTION OF DRAWINGS

FIG. 1 is a schematic illustration of an apparatus in accordance with one embodiment of this invention.

FIG. 2 is a partial cross sectional view, partly schematic, of an outdoor heat exchanger in accordance with the embodiment of FIG. 1.

DESCRIPTION OF THE PREFERRED EMBODIMENTS

It is to be realized that this invention may be employed in any environment in which it is desired to condition a fluid temperature-wise. It has particular usefulness where the fluid is to be heated and where, except for this invention, the evaporator would be subject to freezing-up. It is in the area of air conditioning in which air is circulated within an enclosed space, such as a building or the like, that this invention has widest usefulness at the present. Accordingly, it is in this environment that the embodiment of this invention will be described.

Referring to FIG. 1 for a clear understanding of the invention, the apparatus 11 includes an air handler and air path means 13 that comprises and air blower 17 that is connected with a plenum 19. The air blower 17 may comprise any of the conventional air handlers such as the so called "squirrel cage" blowers that are powered directly or by suitable intermediate links with an electric motor or the like. These blowers and motors are designed for circulating the requisite quantity of air through out the enclosed space to be conditioned; for example, a building or the like.

The plenum 19 may comprise any of the prior art types of plenums. As illustrated, it is a sheet metal or fiber glass major duct with tributary ducts branching off it (the latter not being illustrated). The return to the suction side of the air blower 17 may be by separate ducts or by way of the building structure and suitable louvered inlets to the suction side of the air blower 17. With this technique the air is able to be passed in heat exchange relationship with a refrigerant fluid.

A first refrigerant-fluid (conditioned air) heat exchanger 21 is disposed on the discharge side of the air blower 17 so that the air is passed in heat exchange relationship with the refrigerant fluid that is passed interiorly through the coils of the first exchanger 21. The first heat exchanger 21 serves as an evaporator when the heat pump is being operated in the cooling mode and serves as a condenser when the heat pump is being operated in the heating mode. While the construction of the first heat exchanger 21 may take any of the suitable forms, it is preferable to employ conventional finned copper tube heat exchanger for highly efficient heat transfer regardless of whether the air is being heated or cooled.

In addition to the first refrigerant-air heat exchanger 21, the apparatus 11 also includes a second heat exchanger 27. The second heat exchanger 27 is ordinarily emplaced in a separate compartment, such as exteriorly of the enclosure, or building, and shown by the dashed line 25. The second heat exchanger 27 is connected in series with the first heat exchanger 21 in the refrigerant circuit. The second heat exchanger 27 is employed to reject heat when the apparatus 11 is operated in the cooling mode. Alternatively, it is employed to pick up heat when the apparatus is operated in the heating mode. A fan 23 is provided and powered by suitable electric motor or the like to circulate the ambient air in heat exchange relationship with the refrigerant in the second heat exchanger 27. The second heat exchanger 27, as can be seen in FIG. 2, preferably comprises finned copper tubes or the like to afford highly efficient heat transfer, yet afford trouble free operation for a long periods of time. Any of the other conventional forms, such as aluminum tubes or the like can be employed, although they are more susceptible to corrosive effects of moisture and the like in the refrigerant. Specifically, the heat exchanger 27 is formed of fins 29 and respective rows of copper tubing. As illustrated, the copper tubings 31, 33 comprise copper tubing for refrigerant; for example as fed by way of lines like line 35. A second set of copper tubes 37 are for circulation of a heat exchange fluid; for example, as fed by way of lines like line 39. The respective refrigerant and heat exchange fluids may be flowed in heat exchange relationship through the second heat exchanger 27 in any of the conventional manners. For example, there may be concurrent flow, countercurrent flow, or combination thereof. Of course, it is to be realized that there must be a completed circuit with incoming lines and effluent lines in order to flow the respective refrigerant and heat exchange fluids through the heat exchanger 27.

To provide motive force for flowing the refrigerant through the coils in the heat exchangers, a compressor 41 is employed. The compressor 41 is shown with a capital C in FIG. 1 and may take the form of any of the conventional compressors. Preferably, it is a rotary compressor such as a rolling piston rotary compressor, a rotary vane type compressor or the like that is designed to compress the refrigerant gas at the pressure ratio efficiently.

The discharge side of the compressor 41 is connected by tubing 45 with a desuperheater 47. The desuperheater 47 may be omitted if desired; but it improves the economics in that it saves the cost of heating water for domestic hot water or the like. Basically the desuperheater is a heat exchanger in which the hot refrigerant gas is passed interiorly of the coils on one side and the hot water is passed on the other side.

The discharge side of the desuperheater is connected via line 49 with a reversing valve 51.

The reversing valve 51 is simply a solenoid operated valve in which a plunger directs the refrigerant to one of two paths depending upon whether it is in the cooling or heating mode. A typical reversing valve is illustrated and described in a co-pending application Ser. No. 125,503 filed Feb. 28, 1980, entitled "Multiple Source Heat Pump", Amir L. Ecker, assigned to the assignee of this application; and the descriptive matter of that patent application is incorporated herein by reference for details that are omitted herefrom. Specifically, in the heating mode, the reversing valve is positioned so that the refrigerant, in the form of a hot compressed gas, flows into line 53. Conversely, in the cooling mode, the reversing valve is positioned so that the hot compressed refrigerant flows into the line 55.

The line 53 is connected with the inlet side of the first refrigerant-air heat exchanger 21. This defines a refrigerant flow path for the hot compressed refrigerant gas that allows efficient transfer of heat from the hot compressed refrigerant into the air being circulated into the space to be heated.

As indicated hereinbefore, a throttling valve is connected at each of the inlet sides of the heat exchangers 21 and 27. For example, when the first refrigerant-air heat exchanger 21 is being employed as an evaporator in the cooling mode there is provided a throttling valve 59 that is connected in parallel with a check valve 61. The check valve blocks the flow from the line 60 allowing throttling valve 59 to throttle flow into the heat exchanger 21 to keep it operating efficiently as an evaporator. Using a thermo-electric expansion valve, refrigerant metering is controlled with a thermistor bulb 63, located at the exit of the heat exchanger 21.

Conversely, a throttling valve 65 is connected in parallel with a check valve 67 at the inlet to the second heat exchanger 27. The check valve 67 blocks flow of fluid from the line 60, allowing the throttling valve 65 to throttle liquid refrigerant into the heat exchanger 27 when it is being operated as an evaporator, as in the heating mode. In this case, electric throttling valve 65 is controlled by a thermistor bulb 69 located in the heat exchanger discharger line 71.

The discharge side of the second refrigerant-ambient air-heat exchange fluid heat exchanger 27 is connected as via lines 71 and 55 with the reversing valve 51. The other port of the reversing valve 51 is then connected via line 73 with the suction side of the compressor 41.

If desired, a suitable accumulator can be employed in the refrigerant circuit to aid in the proper refrigerant management. It is not vital, however.

The heat exchange fluid side of the second refrigerant-heat exchange fluid heat exchanger 27 is connected into a heat exchange fluid circuit that includes a source of heat exchange fluid 83, in the form of a storage tank; conduit circuit and heat exchange fluid circulation means; for example, in the form of pumps 85, 87. For heating there is also provided inlet conduit 89, solar collector or receiver 91, and outlet line 93. As illustrated, a hot water heat exchanger 95 is included in the circuit in order to heat hot water in a hot water source 97. This heat exchanger 95 in addition to the desuperheater 47. Also provided is a water inlet line 99 and a hot water outlet line 101. A water heating circulating circuit is provided through the respective serially connected heat exchangers 95 and 47 via conduit 103 and circulating pump 105.

Connected into line 107 connected with the inlet side of the heat exchanger 95 is a check valve 109 that allows the flow to flow downwardly as indicated by the arrows but prevents back flow. Also incorporated into the line 111 is a check valve 113 to allow the heating fluid to be circulated via pump 87 through the serially connected coils 37 of the heat exchanger 27 and line 111 for keeping the heat exchanger 27 above the dew point of the ambient air. The check valve 113 blocks the flow in the reverse direction, however.

As will be appreciated, this circuit arrangement allows use of heat stored in the hot water storage tank 97 in the event of a protracted interval where no sun's energy is being received and the heat stored in the heat exchange fluid tank 83 alone is inadequate to maintain the temperature of the heat exchanger 27 above the dew point. Specifically, pump 87 is turned on to circulate the heat exchange fluid through its coil 37 in the heat exchanger 27. Heat is replenished by circulating the hot water through the heat exchanger 95 by the pump 105.

Ordinarily, it is preferable to employ a heat exchange liquid that is formed of water including an anti freeze like ethylene glycol, diethylene glycol, triethylene glycol or propylene glycol. This prevents difficulties with freezing even when not being circulated. The heat exchanger 95 maintains isolation from the water that is in the hot water storage tank 97 which can be used for normal hot water uses in the home or the like.

The heating source that is illustrated is one or more solar collectors 91 employed to receive the sun's rays, shown by arrows 113 to heat the heat exchange fluid. The heat exchange fluid is circulated through the solar heat exchanger, or collector, 91. Thus the solar collector enables storing heat not only in the water being circulated and being held in the storage reservoir 83, but also in the hot water storage tank 97.

While solar collectors are shown as the source of heating a fluid above ambient temperatures for the heating mode, any of the other sources of heat that may be available can be employed. Such other sources of heat may be at such a low potential that they are frequently neglected as being infeasible for usual purposes. For example, stack gases can be employed to heat the heated fluid; geothermal fluids can be employed if they are available; and low pressure waste steam can be employed to supply heat.

The refrigerant may comprise any of the commerically available materials suitable for normal operating conditions. Ordinarily the refrigerants that are employed in the modern commercial community are polyhalogenated hydrocarbons. Typical of the refrigerants are R-12, dichlorodifluoromethane; R-22, monochorodifluoromethane; or R-502. Other refrigerants are readily available to serve as required in any particular locale.

A temperature sensing bulb 115, may be employed in the refrigerant line downstream of the heat exchanger 27 to monitor the temperature. The temperature controller may be employed to turn on the pump 87 for circulating the fluid in accordance with a manually set temperature to keep the temperature above the dew point. If desired, on the other hand, the bulb can be connected with a controller CON 117 that controls responsive to the dew point temperature as measured by a dew point thermometer 119. The latter is more efficient and will ultimately conserve energy, although initially more costly. From a preferred point of view, therefore, it may be better to simply set the temperature on the thermostat 115 at some temperature above the freezing point of water; for example, above 32° F. or above 0° C. A typical temperature might be about 40° F., 5° C. This arbitary setting without changing it has an advantage, however, that it may allow moisture to accumulate if it falls below the dew point even though it keeps above freezing, because it allows extraction of the latent heat of vaporization of the moisture. On the other hand, there are many times when the temperature below freezing can be tolerated as long as it is above the dew point of the ambient.

One of the options that is available is to run the fan 23 to blow the ambient air past the refrigerant in the heat exchanger 27 when the ambient air has enough heat capacity to be useful; or to stop the fan 23 when the ambient air is too cold and the primary heat source is the heat exchange fluid being circulated by the pump 87.

The controller 117 is connected responsively to a thermostat (not shown) inside the building so as to sense when heating is indicated. The controller 117 is also connected with a temperature sensor in the storage tank 97 as shown by X. When the temperature of the water is above some arbitrary temperature; for example, 120° F.–130° F.; the heat exchange fluid is circulated through the outdoor heat exchanger 27 as the source of heat for vaporizing the liquid refrigerant. If the temperature of the water decreases to the arbitrary temperature or lower, the heat exchange fluid is not circulated as the source of heat although it may be circulated to raise the temperature above the lowest of the dew point or freezing point (32° F.).

In operation, the compressor 41 compresses the hot refrigerant gas which is sent by way of line 45 through the desuperheater 47 to the reversing valve 51. In the heating mode, the reversing valve is placed to send the hot gases on through line 53 to the heat exchanger 21. There heat is given up to the air being circulated by the blower 17. Simultaneously the refrigerant is condensed to a liquid. The liquid is sent via check valve 61 and line 60 to throttling valve 65. The throttling valve 65 throttles the liquid to control the liquid level in the heat exchanger 27 responsive to thermistor 69. Heat may be supplied either by ambient air being circulated by fan 23 or by the heat exchange fluid being circulated by pump 87. The liquid refrigerant is vaporized and passes as a gas via lines 71 and 55 to reversing valve 51. At the reversing valve 51 the gaseous refrigerant is sent to the suction side of the compressor 41 via line 73. As long as the temperature is sufficiently high in the heat exchanger 27, ambient air continues to blow past the refrigerant vaporizing the refrigerant. Once the temperature drops below the lowest of the dew point temperature of the air and 32° F., the controller 117 senses this and turns on pump 87. Ordinarily, the fan 23 is turned off when the pump 87 is turned on. The aqueous solution serving as heat exchange fluid is circulated through the intermediate coils 37 of the heat exchanger, warming up the heat exchanger and the coils 31, 33 containing the refrigerant until they are above the dew point of the ambient air or above 32° F. if the dew point is higher than 32° F. As indicated implicitly hereinbefore, the pump 87 may circulate in a closed loop through the heat exchanger 95, exchanging heat with the water from the storage tank 97 if it is at night or the solar collector 91 is not collecting enough heat. On the other hand, the solar collector 91 may collect more heat than is necessary such that the excess heat is removed in the heat exchanger 95 by the water being circulated by the pump 105 to keep hot water in the storage tank 97. The storage tank 83 serves as an expansion tank to follow for expansion of the liquid and for ridding the liquid of noncondensibles.

From the foregoing it can be seen that as long as the temperature of the second heat exchanger 27 is kept above the dew point of the air, no moisture will collect and there will be no problem of freezing.

Also, the heat exchanger fluid can be employed to supply heat to the refrigerant in the second heat exchanger 27 for efficient operation. This is particularly advantageous when a supplemental stream of heat exchange fluid, as from ground water, waste heat source or the like, is employed.

From the foregoing, it can be seen that this invention accomplished the objects delineated hereinbefore.

Although the invention has been described with a certain degree of particularity, it is understood that the present disclosure is made only by way of example and that numerous changes in the details of construction and the combination and arrangement of parts may be resorted to without departing from the spirit and the scope of the invention, reference for the latter being had to the appended claims.

I claim:

1. Apparatus for conditioning a fluid temperature-wise comprising:
   a. a fluid handler and fluid path means for circulating said fluid in a path in heat exchange relationship with a refrigerant fluid;
   b. at least two refrigerant heat exchangers; a first of the heat exchangers being disposed in the path of the fluid such that the fluid is passed in heat exchange relationship therewith, and a second of the refrigerant heat exchangers being at least disposable in a heat exchange fluid circuit for circulating the refrigerant in heat exchange relationship with a heat exchange fluid and at least disposable in a path of ambient air for circulating said refrigerant in heat exchanger relationship with the ambient air;

c. at least one compressor connected into a refrigerant circuit for efficiently compressing the refrigerant from its inlet pressure to its discharge pressure under conditions of operation of the refrigerant circuit;
d. at least one throttling valve connected at the inlet of a heat exchanger in which liquid refrigerant is being vaporized,
e. a refrigerant circuit serially connecting said heat exchangers, throttling valve and compressor and defining a flow path for said refrigerant;
f. means for selecting the heat exchangers and direction of flow of refrigerant therethrough for selecting a particular mode of operation of the heat pump;
g. refrigerant disposed in said refrigerant circuit and adapted to be circulated in a selected flow path for transferring heat at a coeffecient of performance greater than one;
h. a source of heat exchange fluid;
i. heat exchange fluid circulating means for circulating said heat exchange fluid in a heat exchange circuit and in heat exchange relationship with said refrigerant; and
j. a heat exchange circuit serially connecting said heat exchange fluid source, circulating means and second refrigerant-heat exchange fluid heat exchanger; and
k. control means having means to sense ambient dew point temperature and refrigerant temperature in said second heat exchanger for effecting circulation of said heat exchanger fluid through said second heat exchanger to keep the temperature of evaporating refrigerant above the lowest of dew point temperature of ambient air and 32° F.;
whereby said heat exchange fluid can be circulated through said second heat exchanger to keep said second heat exchanger operating efficiently as an evaporator.

2. The apparatus of claim 1 wherein a reversing valve is included in said refrigerant circuit for effecting operation respectively in the heating mode and in the cooling mode.

3. The apparatus of claim 1 wherein a desuperheater is connected into said refrigerant circuit downstream of said compressor and connected in a hot water circuit serially with a water heater storage for heating said water when said water is circulated in heat exchange relationship with the hot compressed refrigerant gas.

4. The apparatus of claim 1 wherein a dew point sensor is provided in said ambient air for measuring the dew point of said ambient air; a temperature sensor is provided in said refrigerant gas stream downstream of said heat exchanger; and a controller is connected with both said dew point sensor and said temperature sensor and with said heating fluid circulating means such that said heating fluid is circulated through said heating fluid circuit in said second heat exchanger to maintain the temperature of said refrigerant above the dew point of said ambient air.

5. The apparatus of claim 4 wherein said controller is connected with a hot water storage temperature sensor such that circulation of said heat exchange fluid is stopped when said hot water storage temperature sensor decreases to a predetermined minimum temperature; except for emergency defrost.

6. The apparatus of claim 1 wherein said second heat exchanger has an ambient air circulation means for circulating ambient air past said second refrigerant-ambient air-heat exchange fluid heat exchanger.

7. A method of operating a heat pump, having a conventional compressor and refrigerant circuit, in a heating mode comprising the steps of:
a. heat exchanging a heated, compressed refrigerant gas with a fluid being circulated by a fluid handler to heat the fluid and condense the refrigerant gas to form a refrigerant liquid;
b. heat exchanging the refrigerant liquid in an outdoor heat exchanger with optionally ambient air;
c. providing separate heat exchange flow path in said outdoor heat exchanger for a heat exchange fluid;
d. sensing ambient dew point temperature of the outdoor heat exchanger;
e. sensing the temperature of the refrigerant in the outdoor heat exchanger; and
f. circulating a heat exchange fluid at a first temperature through heat exchange fluid flow path in said outdoor heat exchanger at least when the temperature of effluent refrigerant gas is less than the lowest of the dew point temperature of ambient air and 32° F.

8. The method of claim 7 wherein said heat exchange fluid is circulated to supply heat to increase the efficiency of operating said heat pump.

9. The method of claim 7 wherein circulation of ambient air in heat exchange relationship with said liquid refrigerant in said outdoor heat exchanger is stopped and said heat exchange fluid is circulated in heat exchange relationship with said liquid refrigerant in said outdoor heat exchanger.

10. The method of claim 7 wherein said circulation of said heat exchange fluid through said outdoor heat exchanger is stopped when too much heat is removed from stored hot water connected in heat exchange relationship with said heat exchange fluid, as determined by sensed temperature of said stored hot water.

* * * * *